US012577837B2

(12) United States Patent
    Naclerio et al.

(10) Patent No.: US 12,577,837 B2
(45) Date of Patent: Mar. 17, 2026

(54) HIGH PRESSURE BURROWING EVERTING ROBOT WITH SENSORIZED SKIN AND FOR SUBSURFACE SENSOR DEPLOYMENT

(71) Applicants: The Regents of the University of California, Oakland, CA (US); Georgia Tech Research Corporation, Atlanta, GA (US)

(72) Inventors: Nicholas D. Naclerio, Portola Valley, CA (US); Elliot W. Hawkes, Goleta, CA (US); Daniel I. Goldman, Atlanta, GA (US)

(73) Assignees: The Regents of the University of California, Oakland, CA (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/864,137

(22) PCT Filed: Jun. 7, 2023

(86) PCT No.: PCT/US2023/068058
     § 371 (c)(1),
     (2) Date: Nov. 8, 2024

(87) PCT Pub. No.: WO2023/244927
     PCT Pub. Date: Dec. 21, 2023

(65) Prior Publication Data
     US 2025/0305369 A1      Oct. 2, 2025

(51) Int. Cl.
     *E21B 7/20*      (2006.01)
     *B25J 9/14*      (2006.01)
     (Continued)

(52) U.S. Cl.
     CPC ................. *E21B 7/205* (2013.01); *B25J 9/14* (2013.01); *B25J 18/06* (2013.01); *E21B 47/07* (2020.05); *E21B 49/00* (2013.01)

(58) Field of Classification Search
     CPC ............... E21B 7/205; E21B 7/20; E21B 7/26
     See application file for complete search history.

(56) References Cited

U.S. PATENT DOCUMENTS 6,026,900 A * 2/2000 Keller ..................... E21B 43/26
                                                405/184
7,089,798 B2 8/2006 Silverbrook et al.
            (Continued)

FOREIGN PATENT DOCUMENTS

WO      2012148472 A2    11/2012

OTHER PUBLICATIONS

Aguilar et al., "Capturing in-field root system dynamics with RootTracker," Plant Physiology, 2021, pp. 1117-1130, vol. 187, Oxford University Press.
                (Continued)

*Primary Examiner* — Kenneth L Thompson
(74) *Attorney, Agent, or Firm* — Greer, Burns & Crain, Ltd.; Steven P. Fallon

(57) ABSTRACT

A high-pressure burrowing everting robot includes a tubular body formed of a high-pressure skin and airtight bladder arranged to permit pressure to evert the high-pressure skin and bladder together such that the high-pressure skin forms an outer surface of the robot when everted. A sensor is arranged at a distal tip and/or on the outer surface of the high-pressure skin.

13 Claims, 2 Drawing Sheets

(51) Int. Cl.

| | |
|---|---|
| *B25J 18/06* | (2006.01) |
| *E21B 47/07* | (2012.01) |
| *E21B 49/00* | (2006.01) |

(56) References Cited

U.S. PATENT DOCUMENTS

| | | | | |
|---|---|---|---|---|
| 8,567,491 | B2 * | 10/2013 | Lurie | E21B 33/10 |
| | | | | 166/107 |
| 8,701,469 | B2 | 4/2014 | Ober et al. | |
| 9,008,971 | B2 * | 4/2015 | Keller | E21B 49/008 |
| | | | | 73/152.41 |
| 11,226,306 | B2 * | 1/2022 | Burge | G01N 27/3273 |
| 11,633,849 | B2 | 4/2023 | Hawkes et al. | |
| 11,980,921 | B1 * | 5/2024 | Keller | C02F 1/288 |
| 2010/0239797 | A1 | 9/2010 | Alavi | |
| 2019/0217908 | A1 | 7/2019 | Hawkes et al. | |
| 2021/0354289 | A1 | 11/2021 | Hawkes et al. | |

OTHER PUBLICATIONS

Gruebele et al., "Distributed Sensor Networks Deployed Using Soft Growing Robots," 2021 IEEE 4th International Conference on Soft Robotics (RoboSoft), 2021, pp. 66-73, IEEE.

Naclerio et al., "Controlling subterranean forces enables a fast, steerable burrowing soft robot," Science Robotics, 2021, pp. 1-11, vol. 6, AAAS.

Naclerio et al., "Soft Robotic Burrowing Device with Tip-Extension and Granular Fluidization," 2018 IEEE/RSJ International Conference on Intelligent Robots and Systems (IROS), 2018, pp. 5918-5923, Madrid, Spain, IEEE.

Pardossi et al., "Root Zone Sensors for Irrigation Management in Intensive Agriculture," Sensors, 2009, pp. 2809-2835, vol. 9, MDPI.

Hawkes et al., "A soft robot that navigates its environment through growth," Science Robotics, 2017, pp. 1-7, vol. 2, AAAS.

Naclerio et al., "Simple, Low-Hysteresis, Foldable, Fabric Pneumatic Artificial Muscle," IEEE Robotics and Automation Letters, 2020, vol. 5, No. 2, IEEE.

International Search Report from the corresponding International Patent Application No. PCT/US2023/068058, dated Aug. 23, 2023.

* cited by examiner

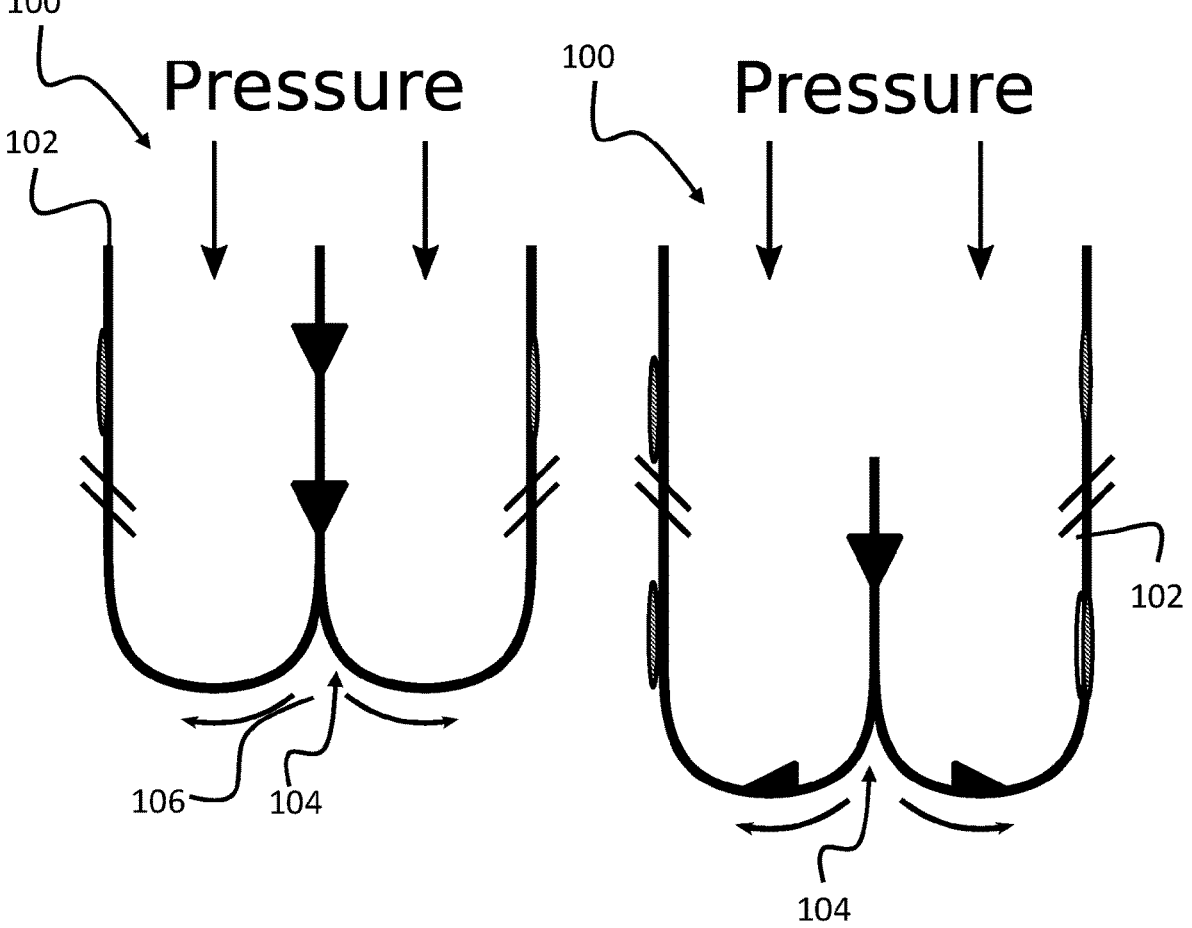
FIG. 1A                    FIG. 1B

HIGH PRESSURE BURROWING EVERTING ROBOT WITH SENSORIZED SKIN AND FOR SUBSURFACE SENSOR DEPLOYMENT

STATEMENT OF GOVERNMENT INTEREST

This invention was made with government support under grant numbers 1944816 and 1915355 awarded by the National Science Foundation. The government has certain rights in the invention.

FIELD

Fields of the invention include vine robot devices and subsurface sensors. Applications for subsurface sensors include agriculture, botany, geology, climate monitoring, planet and moon exploration, and burrowing in reduced gravity environments.

BACKGROUND

Hawkes et al. US Patent Publication US2019/0217908, Published Jul. 18, 2019 describes a growth robot. The growth robot has a thin-walled, hollow, pressurized, compliant body that elongates the body by everting from its tip new wall material that is stored inside the body and controls the shape of the body by actively controlling the relative lengths of the wall material along opposing sides of the body. Relative lengths of the wall material along opposing sides of the body can be controlled by shortening the length of the wall material on the side facing the inside of a turn by using contracting artificial muscles mounted along the length of the body. Relative lengths of the wall material along opposing sides of the body can also be controlled by lengthening the wall material on the side facing the outside of a turn, by releasing pinches in the wall material, or by actively softening the material so that the body lengthens due to the internal pressure. Relative lengths of the wall material along opposing sides of the body can also be controlled by actively restraining the length of the wall material on the side facing the inside of a turn while allowing the wall material on the outside of the turn to lengthen.

An advancement of the growth robot technology by Hawkes et al. is provided in a soft robotic device that has an apical extension and includes fluid emission for burrowing and cleaning. Such soft robots are able to burrow through sand or dirt, in a manner analogous to a plant root. The robot extends apically through eversion, while emitting fluid from the tip that fluidizes sand and soil making it possible to grow underground. That advance is disclosed in PCT/US2019/50998, filed Sep. 13, 2019 and in the published paper by Hawkes et al., entitled "Soft Robotic Burrowing Device with Tip-Extension and Granular Fluidization."

Smart and efficient agriculture would benefit from direct monitoring of plant root growth, soil nutrients, moisture levels, and more. Current technology for such direct monitoring can be expensive to deploy or relatively inaccurate. See, e.g., Pardossi et al. Root Zone Sensors for Irrigation Management in Intensive Agriculture," Sensors 2009, 2809-2835. One type of device is a tensiometer, which is in the form of shaft filled with (distilled) degassed water with a porous ceramic cup at the end and a dial vacuum gauge or a pressure transducer at the top. These devices are expensive, fragile and can be very inaccurate in dry soil conditions. Other types of sensors such as resistance sensors and dielectric sensors can provide accuracy via different sensing techniques, but a cost-effective solution to position the sensors while allowing removal and reinstallation remains elusive. See, Pardossi et al, supra.

Aguilar et al., "Capturing in-field root system dynamics with RootTracker," describes a system to monitor root/soil conditions with an array of "RootTracker," devices. These devices include a ring with an open center housing electronics for communication and power and an array of paddle sensors that must be manually forced into the ground. The plant grows up through the hole in the center. These devices are expensive to deploy for large arrays, and immovable to spot check other areas that may not have the sensors installed before a crop is planted. This type of device is an example of current subsurface sensors, which require placement by pounding or drilling a rigid device into the soil, requiring significant manpower or machinery. Further, such placement disturbs the soil around the device which may be detrimental for sensitive studies.

Gruebele et al., "Distributed Sensor Networks Deployed Using Soft Growing Robots," describes soft growing robots that uses flexible printed circuit boards with self-contained units of microcontrollers and sensors encased in a laminate armor that protects them from unsafe curvatures. The sensors are distributed along the everting robot's length. The sensors included temperature, pressure and humidity sensors, and were tested in relatively defined/forgiving environments, such as the space between clusters of steam pipes. The plastic soft robots described are not suitable for burrowing into soil, especially not for compacted soil.

Most prior everting robots used low density polyethylene (LDPE) tubing as the robot body. This material is limited to a pressure of about 0.035 MPa. See, e.g., Hawkes, Elliot W., Laura H. Blumenschein, Joseph D. Greer, and Allison M. Oamura. "A soft robot that navigates its environment through growth." Science Robotics 2, no. 8 (2017). Other prior everting vine robots are formed from woven nylon fabrics that could withstand a pressure of about 0.4 MPa. Naclerio, N. D., & Hawkes, E. W., "Simple, low-hysteresis, foldable, fabric pneumatic artificial muscle," IEEE Robotics and Automation Letters, 5(2), 3406-3413 (2020). The burrowing performance of a robot is limited by its ability to overcome soil strength, which increases with depth.

Growth of plant roots can be stunted or prevented by over-compacted soil with strength exceeding 2 MPa. Tilled agricultural soils should have strengths less than this for the first 40 cm to promote plant growth. Soils compacted by weathering, foot traffic, or vehicles can provide resistance to root growth that exceeds 5 MPa or more.

SUMMARY OF THE INVENTION

A preferred embodiment provides high-pressure burrowing everting robot that includes a tubular body formed of a high-pressure skin and airtight bladder arranged to permit pressure to evert the high-pressure skin and bladder together such that the high-pressure skin forms an outer surface of the robot when everted. A sensor is arranged at a distal tip and/or on the outer surface of the high-pressure skin.

BRIEF DESCRIPTION OF THE DRAWINGS

FIGS. 1A-1E show a preferred high-pressure everting robot that includes one or more sensors.

DESCRIPTION OF THE PREFERRED EMBODIMENTS

Figures 1C, 1D, 1E:
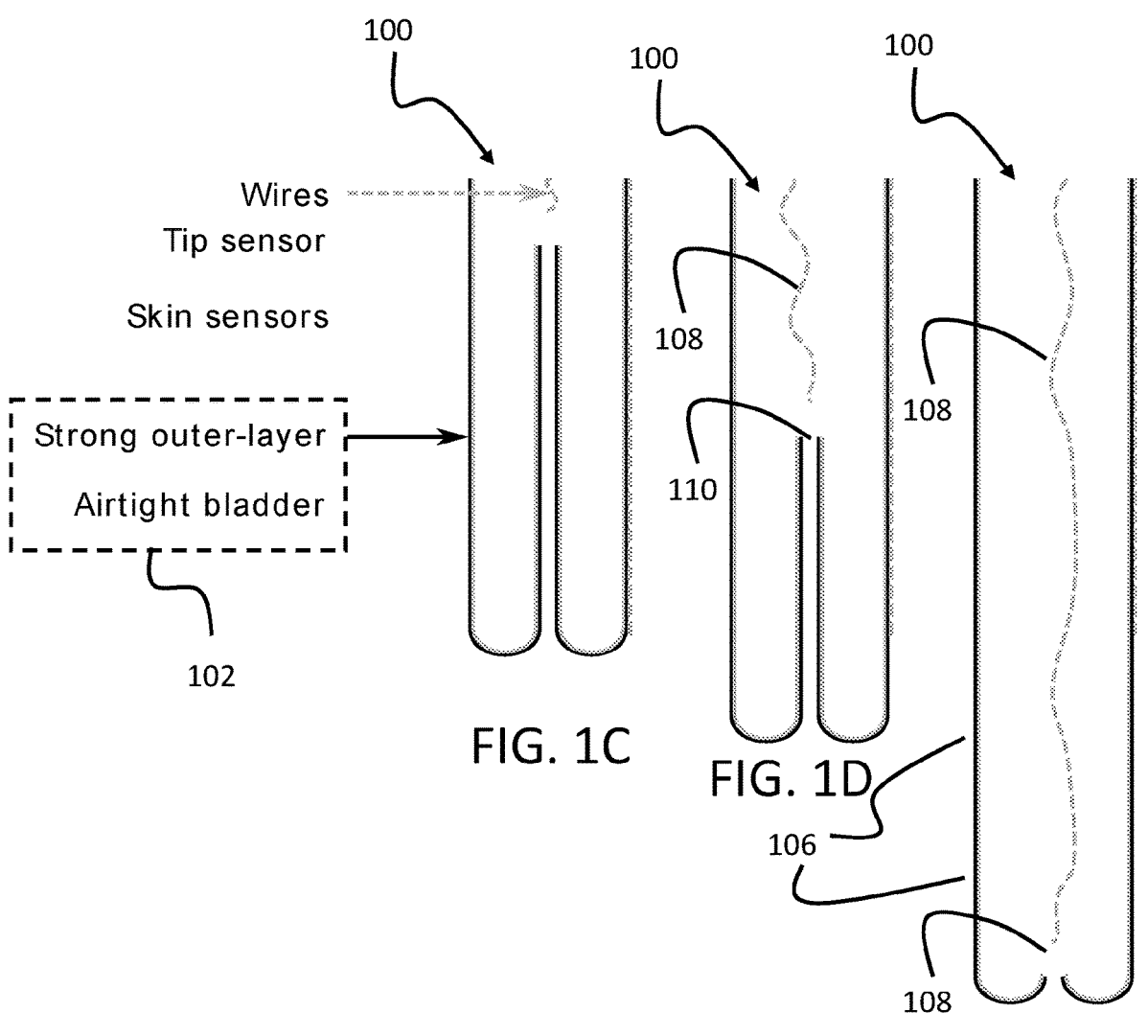

A preferred high pressure burrowing everting robot includes a skin with sensors for subsurface sensing. The robot includes a tip extending everting robot body that withstands high pressure and can grow into soils while exerting pressure of 1-2 MPa for use in agricultural soil, or greater than 5 MPa for more compacted soil. Preferred materials for robot body include composite fabric that can withstand up to 1.7 MPa. Another preferred material is a woven Kevlar® tube, and an everting robot of the invention formed with a woven Kevlar® tube can withstand over 6 MPa. These everting robots of the invention are orders of magnitude stronger than earlier soft everting robots. The present robots can provide accurate and inexpensive subsurface monitoring, and can be deployed at one location, then withdrawn and deployed at a new location, unlike many prior subsurface sensing systems.

Burrowing everting robots of the invention provide subsurface sensing with a much less invasive and less force-intensive method than the subsurface sensors described in the background. By extending from the tip, the skin of the device does not slide relative to the environment. This reduces soil disturbance compared to pounding or drilling a rigid device. Tip extension also reduces the force required to burrow. Because it does not slide against the soil, friction between the skin and soil help the device stay in the soil rather than work against it. As such, it requires less heavy equipment to insert than prior rigid subsurface sensor devices.

A preferred high pressure burrowing everting robot with a skin having sensors has a body of a durable composite fabric with a TPU (Thermoplastic polyurethane) bladder. In example experiments, Dyneema® composite fabric was used. That fabric is a laminate of polyester film and ultra-high-molecular-weight polyethylene (UHMWPE) fibers. UHMWPE is conventionally used in braided fishing line and provides a much higher strength to weight ratio than woven nylon fabric.

Preferred embodiments of the invention will now be discussed with respect to experiments and drawings. Broader aspects of the invention will be understood by artisans in view of the general knowledge in the art and the description of the experiments that follows.

FIGS. 1A-1E show a preferred high-pressure everting robot 100 having a flexible body tube 102 that accepts fluid pressure (gas or liquid) and can be everted via pressure to provide tip 104 growth. Sensors 106 are distributed on the body tube 102. The sensors 106 can be very thin and even with some thickness, e.g. combined atmospheric humidity, temperature, and pressure sensors (Bosch BME280), flexible touch/pressure sensors (UNEO GD03B), light sensors (Advanced Photonix PDV-P8103), microphones (Knowles SPU0410LR5H-QB), accelerometers (MEMSIC MC3419), and many other types of sensors. Sensor thicknesses up to about ¼ body diameter (everted diameter of body tube 102) and lengths less than about ¾ body diameter do not interfere with eversion or inversion of the body tube 102. FIGS. 1A and 1B show the robot 100 in respective less and more everted positions, and the more everted position in FIG. 1B reveals more sensors 106 on an outer skin of the body tube (the outer skin reference the external surface of everted portions of the body tube 102 formed by the high-pressure material). It is preferable that sensors 106 be distributed along an axial length of the body tube 102 such that as the tube 102 everts and the tip 104 advances, sensors 106 are disposed at different depths and/or horizontal positions of a medium into which the robot 102 is burrowing. The tube 102 is multi-material, with a bladder tube to hold fluid (e.g., air) and an outer tube of high-pressure resistant material, as indicated in FIG. 1C. One or more electrical leads 108

(FIGS. 1C-1E) connect to the sensors 106 to provide signals to external conventional data acquisition (DAQ) systems. The leads 108 extend through a lumen formed from the body 102, the lumen being formed in partially or fully everted positions of the body 102. Connection can also be wireless, or via wires on the high-pressure skin of the body 102. The external equipment can include data storage and communications for communicating acquired data from a distant location, which could even be from a landing craft on Mars, to a monitoring, storage and analysis center. FIGS. 1C-1E also shows a separate tip sensor 110. The sensors 106, 110 can include different types of sensors, e.g., temperature, humidity, moisture, pressure, sound, light, gas, acceleration and seismic. An example sensor is a thin electrode bonded to the outer surface. A change in conductance of the electrode can be used to measure a physical property. Another example system is one that can provide a plurality of discrete sensors at a common sensor location, with the discrete sensors being connected by flexible electronics. Flexible biological sensors composed of living bacteria or other organisms can be deployed as well.

The robot 100 provides plant-root-like tip extension with a thin-walled tubular body 102 as it everts but can exert much higher pressures that prior soft everting robots. Like prior everting soft robots, when pressurized, the body tube 102 everts, passing new material out of the tip to extend, but can do so while exerting pressures of 1-6 MPa or more, allowing penetration into compacted and resistant materials. The robot 100 can retracted by pulling back on the new material to reinvert.

The sensors 106 and tip sensor 108 can be deployed subsurface as the robot 100 everts, while already deployed portions of the body 102 remain stationary relative to the surrounding material into which the robot is being deployed. The sensors 106 can therefore be deployed at known positions along the robot's body 102, which correspond to specific penetration depths/locations based upon the angle the robot 100 burrows into material. The tip sensor 108 is deployed at the maximum everted length of the robot 100.

The reaction force of the robot 100 required to burrow with tip extension is less than that of a rigid device. As any device burrows, it must overcome the resistive force at its tip, and any friction along its sides. The longer and larger the device is the more friction there is. However, because this device extends from its tip, the friction along its sides acts in the direction of tip-extension rather than against it. As a result, the reaction force at the base of the device decreases with increasing friction, rather than increasing in the case of a rigid device. The high pressure body 102 permits burrowing into more difficult to penetrate materials, while achieving advantages of eversion deployment.

During operation, fluid, e.g., air, is delivered into the body (such as from an external pump) with sufficient pressure to slowly inflate and invert the robot with sufficient force for it to burrow and deploy subsurface. The bladder ensures an airtight seal, while the high-pressure composite body 102 allows use of sufficient pressure, e.g., above 1 MPa burrowing. Methods and devices for providing pressure for growth are disclosed for example, in Hawkes et al. US Patent Publication US2019/0217908.

Experimental High-Pressure Burrowing Everting Robots

Robot body tubes were formed by bonding Dyneema® together with a lap joint adhered by pressure sensitive adhesive tape. The bond strength pressure sensitive adhesive tape generally exceeds the strength of the Dyneema®. Dyneema® is susceptible to pinprick sized leaks, so a 50 μm thick bladder of thermoplastic polyurethane film is placed inside the Dyneema® tube to prevent any leaks. 1 cm diameter tubes formed with 40 μm thick Dyneema® and 13 mm bond width seams can withstand up to 1 MPa of pressure. This is strong enough for shallow burrowing and sensor placement. 1 cm diameter tubes made from 90 μm thick Dyneema® and 50 mm bond widths can withstand up to 1.7 MPa. For commercial manufacturing, the high-pressure tubes could be made with a circular weaving machine using a high-strength polymer fiber such as UHMWPE (i.e., Dyneema®) or aramid (i.e., Kevlar®) with a thermoplastic (i.e., TPU) or thermoset (i.e., silicone) polymer coating or impregnation. This method is used to fabricate fire hoses.

Other experimental robot body tubes were formed of Kevlar®, which is a heat-resistant polymer fiber with a very high tensile strength. A commercially woven 15 mm diameter, 2 mm thick Kevlar® tube with a 380 μm thick commercially formed TPU tube inside it was used. The prototype held over 6 MPa of hydraulic pressure.

The burrowing performance of any device is limited by its ability to overcome soil strength, which increases with depth. The growth of plant roots can be stunted or prevented by over-compacted soil with strength exceeding 2 MPa. Tilled agricultural soils should have strengths less than this for the first 40 cm to promote plant growth. Soils compacted by weathering, foot traffic, or vehicles can have higher of 5 MPa or more. Therefore, a tip extending device in accordance with the invention can be formed with materials and a size to exert a pressure of 2 MPa for use in agricultural soil, or greater than 5 MPa for more compacted soil. Experiments demonstrated over 6 MPa, and optimization of the present designs with respect to bladder material, high-pressure material, and diameter will provide even high pressure capability.

Applications

Preferred applications include as robots in a system to monitor plant root growth, soil nutrients, moisture levels, and more. Sensors of the invention can be deployed pneumatically in an array, decreasing placement time and labor costs.

Geology and climate monitoring applications include non-invasive placement of sensors detect seismic activities, greenhouse gasses and other chemicals of interest. Low-force deployment method reduces machinery required to deploy in remote locations.

Subsurface sensor deployment is particularly useful in reduced or microgravity environments where reaction forces to drive a sensor into the ground are difficult to produce. Useful applications would include but are not limited to: 1) The deployment of subsurface thermal sensors, such as on the NASA InSight HP3 thermal probe that failed to burrow into the Martian surface. 2) The deployment of subsurface seismic sensors, such as on the NASA InSight SEIS seismic probe that suffered noise due to Martian wind because it was deployed on the surface, rather than below it. 3) The deployment of sensors through icy bodies, such as glaciers, ice sheets, and snowpack on Earth and icy worlds such as Europa and Enceladus.

Present high-pressure robots with everting sensor deployment can work in conjunction with other force reduction and soil moving methods such as drilling, vibration, fluidization, and heating to melt ice.

Eversion has an advantage over current probes that rely on ice melting to move through frozen bodies because once the tip has everted the body can become frozen into the ice without impeding the extension of the tip.

This method of everting sensor placement can also be used to measure geotechnical properties by recording forces on the device as it is placed into the ground and pulled out or retracted from the ground. This method could replace or compliment penetrometer and shearvane measurements.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A high-pressure burrowing everting robot, comprising a tubular body formed of a high-pressure skin and airtight bladder arranged to permit pressure to evert the high-pressure skin and bladder together such that the high-pressure skin forms an outer surface of the robot when everted, and a sensor arranged at a distal tip and/or a sensor on the outer surface, comprising leads to the sensor arranged at a distal tip and/or the sensor on the outer surface that extend through a lumen formed by the body when everted.

2. The high-pressure burrowing everting robot of claim 1, wherein the sensor on the outer surface comprises a plurality of discrete sensors connected by flexible electronics.

3. A high-pressure burrowing everting robot, comprising a tubular body formed of a high-pressure skin and airtight bladder arranged to permit pressure to evert the high-pressure skin and bladder together such that the high-pressure skin forms an outer surface of the robot when everted, a sensor arranged at the distal tip, and the sensor on the outer surface.

4. The high-pressure burrowing everting robot of claim 3, wherein the sensors on the outer surface comprise thin electrodes bonded to the outer surface.

5. The high-pressure burrowing everting robot of claim 3, wherein the sensors on the outer surface comprises a connection that is wireless, via wires on the high pressure skin of the robot, or via wires inside a lumen formed by the body when everted.

6. The high-pressure burrowing everting robot of claim 3, comprising a plurality of sensors arranged along a length of the outer surface.

7. The high-pressure burrowing everting robot of claim 6, wherein the sensor arranged at the distal tip and the sensors arranged along the length of the outer surface are selected from atmospheric humidity, temperature, pressure sensors, flexible touch, light, microphone and accelerometer sensors.

8. The high-pressure burrowing everting robot of claim 6, wherein the tubular body comprises a composite body that can withstand a pressure of at least 1 Mpa.

9. The high-pressure burrowing everting robot of claim 8, wherein the tubular body comprises a composite body that can withstand a pressure of between 1 Mpa and 6 Mpa.

10. The high-pressure burrowing everting robot of claim 6, wherein the high-pressure skin is a durable composite fabric.

11. The high-pressure burrowing everting robot of claim 10, wherein the bladder is a thermoplastic material.

12. The high-pressure burrowing everting robot of claim 11, wherein the durable composite fabric is a fabric laminate of polyester film and ultra-high-molecular-weight polyethylene (UHMWPE) fibers.

13. The high-pressure burrowing everting robot of claim 11, wherein the durable composite is an aramid plastic fabric.

\* \* \* \* \*